Feb. 23, 1926. 1,574,234
A. B. CUMNER
MEANS FOR DRAINING MOTOR VEHICLE CRANK CASES AND THE LIKE
Filed Feb. 27, 1925
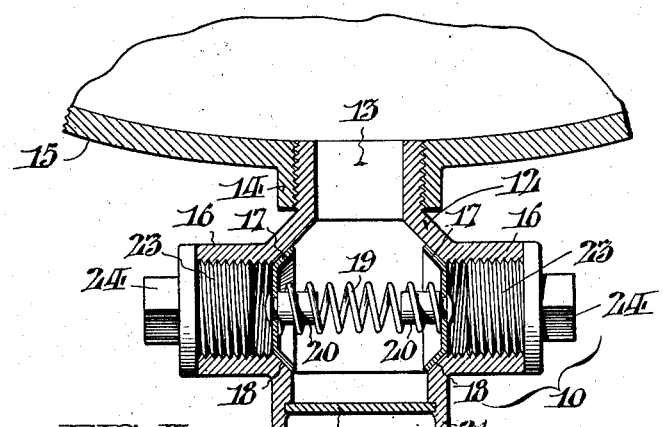
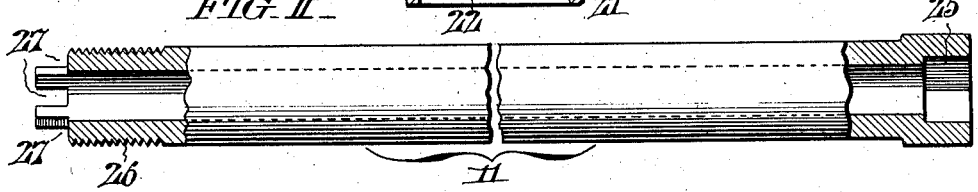
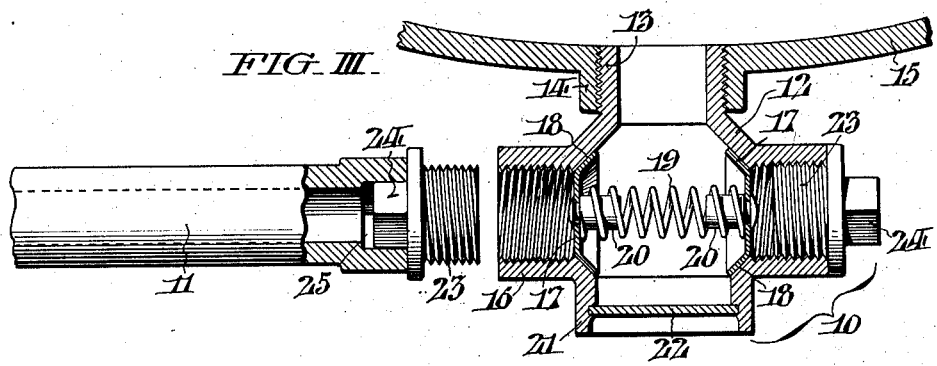
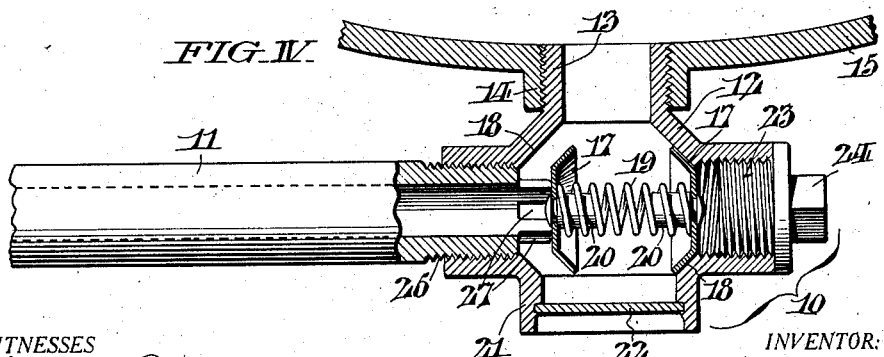
WITNESSES
INVENTOR:
Arthur B. Cumner;
BY
ATTORNEYS.

Patented Feb. 23, 1926.

1,574,234

UNITED STATES PATENT OFFICE.

ARTHUR B. CUMNER, OF PHILADELPHIA, PENNSYLVANIA.

MEANS FOR DRAINING MOTOR-VEHICLE CRANK CASES AND THE LIKE.

Application filed February 27, 1925. Serial No. 12,050.

*To all whom it may concern:*

Be it known that I, ARTHUR B. CUMNER, a citizen of the United States, residing in Philadelphia, in the county of Philadelphia and State of Pennsylvania, have invented certain new and useful Improvements in Means for Draining Motor-Vehicle Crank Cases and the like, whereof the following is a specification, reference being had to the accompanying drawings.

This invention relates to means for draining lubricant or other fluids from crank cases, transmission housings, differential gear housings, fuel tanks, radiators and other parts of motor vehicles. Such casings or auxiliary receptacles are ordinarily equipped simply with common removable screw plugs or pet cocks for the purpose of draining,— these fittings being usually at very inconvenient locations and accessible only from beneath the vehicle, and this being especially true of vehicles of the low or underslung variety. On account of the difficulty of reaching and manipulating such inaccessible fittings necessary draining is frequency postponed or neglected and this often results in serious injury to the motor or running parts.

My invention has for its objects to overcome the difficulty noted above by enabling all operations incidental to draining to be accomplished without the necessity for crawling under, or placing a receiving receptacle beneath, the vehicle; and to provide a simple and inexpensive means for the purpose adaptable to all standard types of motors without requiring any changes in them, nor special tools, in applying the means.

In the drawings:

Fig. 1 is a fragmentary sectional view of the crank case of a motor showing the draining valve constituting one of the parts of my invention.

Fig. 2 is a sectional view of the actuating implement which I provide for operating the valve.

Figs. 3 and 4 show successive steps in the act of draining the crank case of a motor in accordance with my invention.

In these illustrations, 10 indicates—comprehensively—the valve, and 11 the actuating implement therefor, which together constitute the crank case draining means of my invention. The valve 10 comprises a casing 12 that is provided with a threaded neck 13 so as to be screwable into the usual drain opening 14 of the crank case of the motor indicated at 15 in substitution for the usual closure member or pet cock. The valve casing 12 has oppositely disposed lateral outlets 16, with which are associated frusto-conical valve disks 17 that are normally held in closed position against flared seats 18 as shown in Fig. 1, by a common helical spring 19 in compression between them, said spring being held from displacement by axial studs 20, projecting inwardly from said disks. In order to enable introduction of the disks 17, in initially assembling the valve, the casing 12 is provided with an opening 21 at the bottom in direct alignment with its neck 13, said opening being subsequently permanently closed by a stopper disk 22 welded or otherwise secured in place. The outlets 16 of the valve casing 12 are internally threaded to take sealing plugs 23, formed with projecting polygonal heads 24. These plugs 23 serve to prevent loss of oil through possible leakage past the valve disks 17.

Referring now to the actuator implement 11 shown in detail in Fig. 2, it will be observed that the same is in the form of a tubular bar, which, in reality, is of such length that the valve 10 may be reached from either side of the vehicle. One end 25 of the implement 11 is fashioned to the form of a socket wrench to fit the polygonal projections 24 of the plugs 23; while its opposite end is threaded as shown at 26 so as to be screwable into the outlets 16 of the valve, the extreme tip of this end being slotted to afford open intervals as shown at 27 for a reason to be presently explained.

In operation, the end 25 of the implement is applied from either side of the vehicle as found most convenient, to the polygonal head 24 of the corresponding plug 23 to remove the same after the manner shown in Fig. 3. Upon removal of the plug 23, the implement 11 is reversed, and its end 26 screwed into the same outlet of the valve, the tip 27 incidentally depressing the valve disk 17 against the action of the spring 19 and moving the same to open position as shown in Fig. 4. The contents of the crank case 15 will thereupon enter the hollow of the implement 11 by way of the intervals 27 and be conducted for discharge to a point beyond the confines of the vehicle. When not in use, the implement 11 can be conveniently packed away with other tools with which motor vehicles are customarily equipped.

By constructing the valve 10 as described, it will be seen that the crank case draining means of my invention is applicable to all standard types of motor vehicles without requiring any changes whatever in them, nor the use of any special tools in attaching. If desired, however, the valve 19 could be readily incorporated as a part of the crank case 15 without departing from the principle involved, and the claims are accordingly, generally speaking, to be accorded liberal interpretation in this regard. Also, the term "crank case" as used in the claims is to be construed as comprehensive of other similar parts of a motor vehicle such as those mentioned in the introductory paragraph of this specification.

Having thus described my invention, I claim:

1. Means for draining motor vehicle crank cases including a drain valve having a self-seating closure, in combination with a valve opening conduit adapted to drain off the contents of the crank case.

2. Means for draining motor vehicle crank cases including a drain valve having a self-seating plug, in combination with a plug displacing implement functional to conduct off the contents of the crank case beyond the confines of the vehicle.

3. Means for draining motor vehicle crank cases including a conduit implement screwable into an outlet from the crank case to conduct off the contents therefrom.

4. Means for draining motor vehicle crank cases including a drain valve, in combination with an implement to open said valve and provide a drain conduit to conduct off the contents of the crank case.

5. Means for draining motor vehicle crank cases including a drain valve with a plug normally closing its outlet, in combination with an implement for removing the plug, opening the valve, and providing a drain conduit to conduct off the contents of the crank case.

6. Means for draining motor vehicle crank cases including a drain valve; in combination with a tubular implement screwable into the drain outlet of the valve to open said valve, and to provide a drain conduit to conduct off the contents of the crank case.

7. Means for draining motor vehicle crank cases including a drain valve with a spring-pressed disk to normally hold its outlet closed; in combination with a tubular implement screwable into the valve outlet to depress the disk, and provide a conduit to conduct off the contents of the crank case.

8. Means for draining motor vehicle crank cases including a drain valve with opposed lateral outlets; in combination with a tubular implement screwable into either of said outlets to open said valve, and provide a conduit for conducting off the contents of the crank case to corresponding sides of the vehicle.

9. Means for draining motor vehicle crank cases including a drain valve with a plug normally sealing its outlet; in combination with a tubular implement with one end fashioned to the form of a wrench for removing the plug, and with the other end threaded to engage in the valve outlet and open the valve, said element functioning in the latter instance in the additional capacity of a conduit to conduct off the contents of the crank case.

10. Means for draining motor vehicle crank cases including a drain valve with opposed lateral outlets, individual valve disks associated with said outlets, and a common compression spring operative between the disks to normally keep the outlets closed; in combination with a tubular implement screwable into either of said outlets to depress the respectively associated valve disk and to serve as a conduit for conducting off the contents of the crank case to the corresponding side of the vehicle.

11. Means for draining motor vehicle crank cases including a valve fitting substitutable for the usual closure of the drain opening in the motor crank case, said fitting having oppositely-disposed lateral outlets with individually-associated valve disks, a common compression spring operative between said disks to normally maintain them in closed position, and screw plugs to seal the outlets; in combination with an elongated tubular implement with one end fashioned as a wrench for removing either of the plugs, and the other end threaded so as to be screwable into the outlet after removal of the plug to depress the associated valve disk to open position, said element functioning in the latter instance in the additional capacity of a conduit to conduct off the discharge from the crank case to the corresponding side of the vehicle.

12. In means for draining motor vehicle crank cases of the type described, a fitting for insertion in the usual drain opening, said fitting having oppositely-disposed lateral outlets with individually associated valve disks, a compression spring operative between said disks to normally maintain them in closed position, and removable screw plugs normally sealing the aforesaid lateral outlets.

13. In means for draining motor vehicle crank cases of the type described, a valve-opening tubular-implement having one end fashioned as a wrench and the other end screw threaded, for the purpose specified.

14. In means for draining motor vehicle crank cases of the type described, a valve-opening tubular-implement having one end fashioned as a socket wrench with the other end externally screw threaded and slotted to afford intervals, for the purpose specified.

In testimony whereof, I have hereunto signed my name at Philadelphia, Pennsylvania, this 19th day of February 1925.

ARTHUR B. CUMNER.